(No Model.)
F. W. HILL.
MEASURING AND REGULATING DEVICE FOR ADJUSTABLE SCHOOL FURNITURE.
No. 535,287. Patented Mar. 5, 1895.
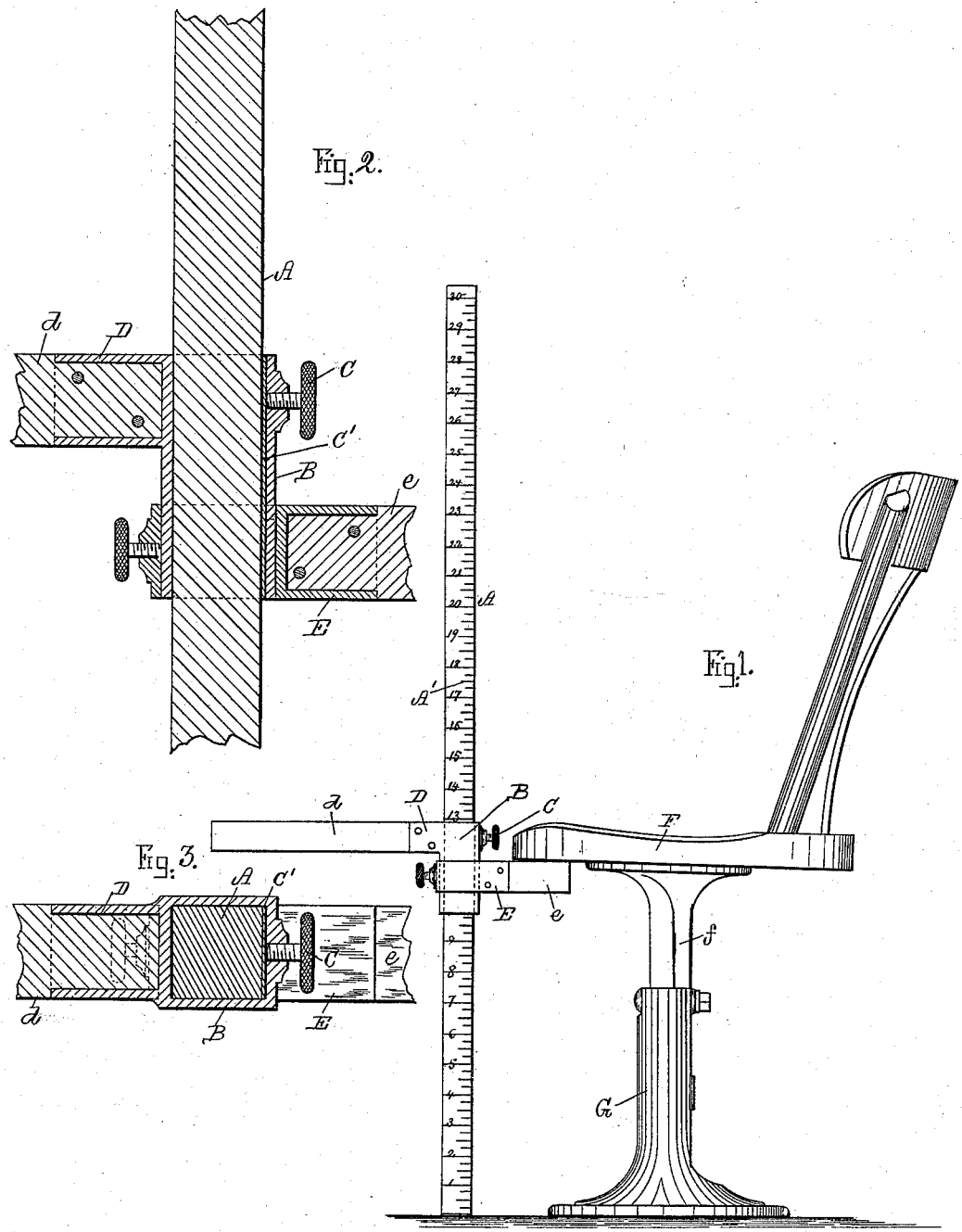
Witnesses
Lauritz N. Möller
Charles A. Harris
Inventor
Frederick W. Hill
by Alvan Andrien
his atty.

United States Patent Office.

FREDERICK W. HILL, OF BOSTON, MASSACHUSETTS, ASSIGNOR TO THE CHANDLER ADJUSTABLE CHAIR AND DESK COMPANY, OF SAME PLACE.

MEASURING AND REGULATING DEVICE FOR ADJUSTABLE SCHOOL FURNITURE.

SPECIFICATION forming part of Letters Patent No. 535,287, dated March 5, 1895.

Application filed October 29, 1894. Serial No. 527,234. (No model.)

*To all whom it may concern:*

Be it known that I, FREDERICK W. HILL, a citizen of the United States, and a resident of Boston, in the county of Suffolk and State of Massachusetts, have invented new and useful Improvements in Measuring and Regulating Devices for Adjustable School Furniture, of which the following, taken in connection with the accompanying drawings, is a specification.

This invention relates to improvements in measuring and regulating devices for adjustable school furniture and it has for its object to measure that portion of the leg from the knee to the foot of pupils in schools, and regulating the height of the seat of adjustable school chairs accordingly so as to adjust such chairs properly relative to legs of the pupils without making repeated trials of adjustment of such adjustable school chairs.

The device although especially designed for the adjustment of chairs or seats, may to equal advantage be used for adjusting and regulating the height of desks or other furniture as will hereinafter be more fully shown and described reference being had to the accompanying drawings, wherein—

Figure 1 represents a side elevation of the device shown in position for adjusting the height from the floor of an adjustable chair seat. Fig. 2 represents a vertical section of the improved measuring and regulating device; and Fig. 3 represents a cross section on the line 3—3 shown in Fig. 2.

Similar letters refer to similar parts wherever they occur on the different parts of the drawings.

The invention consists of a bar or rod A which may be round or polygonal in section, smooth or screw threaded and preferably made of wood or metal as shown. Said bar may have a scale A' divided in inches or any other unit of measure as shown in Fig. 1. If so desired it may have an inch scale on one side, a meter scale on another or it may have a scale corresponding to the numbers indicated on the base or adjustable seat shank of the adjustable seat, chair or desk or other furniture as may be most desirable.

Upon the rod A, is adjustably fitted a socket B, preferably made of metal and preferably provided with a binder screw C screwed through the wall of said socket and adapted to bear against the rod A so as to secure said socket in the desired position on the rod as shown. The said binder screw may however be dispensed with and a frictional spring C' secured to the inside of the socket B and adapted to bear with a proper pressure against the side of the rod A as shown in Fig. 2; or if so desired both the friction spring and binder screw may be used for the purpose of holding the socket B in its adjusted place on the said rod A, without departing from the spirit of my invention.

The socket B has an upper branch D to which is secured in a suitable manner the horizontal limb measuring bar $d$, and to its opposite side is secured or made in one piece with said socket B another branch or socket E to which is secured in a suitable manner the horizontal seat measuring bar $e$ as shown.

In practice I prefer to make the lower seat measuring bar $e$ and its branch or socket E adjustable up or down on the socket B to compensate for variations in the thickness of the chair seat and provide said socket E with suitable means for securing it in position on the socket B after being adjusted thereon, or said bars $d$ and $e$ may be adjustably secured directly on the measuring bar A independent of each other without having their sockets made telescopic if so desired without departing from the spirit of my invention.

F in Fig. 1 represents a vertically adjustable chair seat to which the shank $f$ is attached in any suitable manner, and G represents the stationary base of the chair or school furniture on which the shank $f$ is vertically adjustable according to the size of the scholar for which the chair or school furniture is to be used.

My invention does not relate to any particular adjustable school or other furniture as it is equally applicable for measuring and regulating the height of school furniture of any adjustable construction.

In using the device I proceed as follows: The scholar being seated the limb measuring bar $d$ is moved up against the under side of the upper limb close to the knee portion or junction with the lower limb, and secured in such adjusted position to the bar A in any suitable manner as may be desired. The device is then taken to the chair or furniture to be adjusted and the bar e placed below the chair seat F, as shown in Fig. 1 and the latter lowered until it comes in contact with said bar e as shown in said Fig. 1 when the chair may be secured in position to its base and is then of the proper height according to the size of the pupil whose limb has been measured.

The device may be used to measure from the upper surface of the seat instead of from its under side, but in practice it is more convenient to proceed in the manner above described.

When using the device as above mentioned I make or arrange the vertical distance from the top of the seat measuring bar e to the top of the limb measuring bar d, equal to or about equal to the thickness of the seat F shown in Fig. 1.

The device is equally useful for measuring the height of desks or other furniture relative to the size of the pupils.

Having thus fully described the nature, construction, and operation of my invention, I wish to secure by Letters Patent and claim—

1. A measuring and regulating device for adjustable furniture, comprising a graduated bar A, a socket B vertically adjustable thereon and provided at its upper end with a rigid arm d projecting horizontally to one side of said socket, a socket E vertically adjustable on the socket B and provided with a rigid arm e projecting horizontally in a direction opposite to the arm d, and means for securing said sockets in their adjusted positions, substantially as described.

2. A measuring and regulating device for adjustable school furniture, comprising a graduated bar A, a socket B vertically adjustable thereon and provided at its upper end with a horizontally projecting arm d, means for securing said socket in its adjusted position, a socket E vertically adjustable on the socket B and provided with a horizontal arm projecting in a direction opposite to the arm d, and means for adjustably securing said sockets together, substantially as shown and described and for the purpose specified.

In testimony whereof I have signed my name to this specification, in the presence of two subscribing witnesses, on this 26th day of October, A. D. 1894.

FREDERICK W. HILL.

Witnesses:
ALBAN ANDRÉN,
JAMES H. BUTLER.